United States Patent Office 3,763,260
Patented Oct. 2, 1973

3,763,260
HYDROCARBON CONVERSION CATALYST
Ernest L. Pollitzer, Skokie, Ill., assignor to Universal Oil Products Company, Des Plaines, Ill.
No Drawing. Continuation-in-part of abandoned application Ser. No. 20,125, Mar. 16, 1970. This application Nov. 10, 1971, Ser. No. 197,375
Int. Cl. C07c 3/62
U.S. Cl. 260—672 T
3 Claims

ABSTRACT OF THE DISCLOSURE

A catalytic composite comprising a mordenite component having a $SiO_2/Al_2O_3$ mole ratio of at least 40:1 prepared by acid extracting $Al_2O_3$ from mordenite prepared with an initial $SiO_2/Al_2O_3$ mole ratio of about 12:1 to about 30:1 and a metal component selected from copper, silver and zirconium. The composite is particularly useful for the transalkylation of alkylaromatic hydrocarbons and the alkylation of aromatic hydrocarbons.

CROSS-REFERENCE TO RELATED APPLICATIONS

This application is a continuation-in-part of my copending application Ser. No. 20,125, filed Mar. 16, 1970, now abandoned, the teachings of which are incorporated herein by specific reference thereto.

BACKGROUND OF THE INVENTION

This invention relates to an improved catalytic composition of matter comprising a mordenite component and a metal component. This invention further relates to the use of this improved catalytic composite as a hydrocarbon conversion catalyst, possessing improved stability over prior art catalysts, particularly for catalyzing hydrocarbon transalkylation reactions.

Mordenite is a crystalline aluminosilicate of the zeolite type which is well known to the art both as an adsorption agent and as a catalytic agent in hydrocarbon conversion reactions. Mordenite, as typically manufactured or found in nature, is highly siliceous and is characterized by a silica ($SiO_2$) to alumina ($Al_2O_3$) ratio of about 10. The mordenite crystalline structure comprises four and five membered rings of $SiO_4$ and $AlO_4$ tetrahedra so arranged that the resulting crystal lattice comprises pores and channels running parallel along the crystal axis to give a tubular configuration. This structure is unique among the zeolite crystalline aluminosilicates in that the channels do not intersect and access to the cages or activities can be in only one direction. For this reason, the mordenite structure is frequently referred to as two-dimensional in contrast to the other known crystalline aluminosilicates such as faujasite in which the cavities can be entered from three directions.

As stated, mordenite, as commercially available, has a $SiO_2/Al_2O_3$ mole ratio of about 10 and is usually characterized as being in the sodium form. Before the sodium form of mordenite can be utilized as an effective catalyst for hydrocarbon conversion reactions, it must be first converted to either the hydrogen form and/or substitute the alkali metal ion (typically sodium) with a catalytically active metal cation. Mordenite, since it has a high initial $SiO_2/Al_2O_3$ mole ratio and is more acid resistant than faujasite, may be converted to the hydrogen form by replacing the sodium ion with a hydrogen ion by treatment with an aqueous solution of a mineral acid. Hydrogen ion exchanged mordenites are often termed H-mordenite and are illustrated in U.S. Pat. No. 3,281,482. The catalytic activity of mordenites may also be increased by extracting a portion of the alumina from the mordenite crystal structure, as well as simultaneously ion exchanging hydrogen ions, by treatment with mineral acids under relatively severe temperatures and contact time. Produced are aluminum-deficient mordenites maintaining the same gross crystal structure in terms of gross interatomic distances as the original mordenite, as measured by X-ray diffraction patterns. Mordenites that have been so acid extracted typically have a $SiO_2/Al_2O_3$ ratio in excess of 25/1 which may extend to 100/1 or more. These acid extracted mordenites are exemplified by U.S. Pat. No. 3,480,539. Acid extracted mordenites which are particularly effective and active catalysts have $SiO_2/Al_2O_3$ ratios in excess of 50:1.

Commercially available mordenites have a $SiO_2/Al_2O_3$ ratio of about 10 which are utilized to prepare the described acid extracted mordenite are typically prepared by heating an alkali metal aluminate in solution with an alkali metal hydroxide in contact with a silica source whereby the mordenite is precipitated from the reaction mixture. For example, an aqueous solution of sodium aluminate and sodium hydroxide is heated to a temperature of about 180–220° F. in contact with a suitable silica source such as sodium silicate, reactive amorphous silica gel, or aqueous colloidal silica sol. Crystallization occurs over a relatively short period of time, such as about 8 to 12 hours. As previously stated, the higher $SiO_2Al_2O_3$ ratio mordenite catalysts are then prepared by the acid extraction of commercially available Na-mordenite having this initial $SiO_2/Al_2O_3$ ratio of about 10 with relatively strong mineral acids which not only physically extract alumina from the crystal structure but also replace the sodium ions with hydrogen.

Attempts to produce directly, in a single step synthesis, mordenite having an initial $SiO_2/Al_2O_3$ ratio of about 40:1 or more are generally unsuccessful in that the resultant product is an amorphous, rather than crystalline, silica-alumina composite in admixture with a mordenite of about a 10:1 $SiO_2/Al_2O_3$ ratio. However, as described in my copending application Ser. No. 20,125, it has been found that mordenite may successfully be synthesized directly in a single step procedure with a $SiO_2/Al_2O_3$ ratio greater than the 10/1 ratio presently commercially available, namely a $SiO_2/Al_2O_3$ ratio of more than 10/1 up to about 30/1. Acid extraction of this mordenite utilizing the same techniques as utilized by the art in acid extracting the commercially available mordenite with a 10:1 $SiO_2/Al_2O_3$ mole ratio also yields mordenite compositions with $SiO_2/Al_2O_3$ mole ratios in excess of 50:1. However, the acid extracted mordenites which have this increased $SiO_2/Al_2O_3$ ratio of 50:1 or more and which have prime utility as catalytic composites, when prepared from a mordenite composition having an initial 12:1–30:1 $SiO_2/Al_2O_3$ ratio have a startlingly greater activity than those mordenites prepared from a mordenite having a $SiO_2/Al_2O_3$ ratio of about 10:1, particularly when employed in hydrocarbon conversion reactions such as alkylation and transalkylation. This result obtains despite the fact that the acid extracted mordenite, when prepared from either initial mordenite source, appears to have identical $SiO_2/Al_2O_3$ mole ratios and physical properties.

Performance of a given catalyst in a hydrocarbon conversion process is typically measured by the activity and stability of the catalyst. Activity refers to the ability of the catalyst to convert a hydrocarbon reactant into the desired product at a specified set of reaction conditions. Stability refers to the rate of change in the activity of the catalyst. Instability is the loss of activity of the original catalyst during use. A particular problem in the hydrocarbon conversion art is the development of a more active conversion catalyst which is, at the same time, more stable than conventional catalysts.

SUMMARY OF THE INVENTION

In an embodiment therefore, the present invention relates to a catalytic composition of matter comprising a zeolite component of the mordenite type having a silica to alumina mole ratio of at least 40:1 prepared from an initial mordenite composition first prepared with a silica to alumina ratio of about 12:1 to about 30:1 and a metal component selected from copper, silver, gold and zirconium. Preferred in the zeolite component are final silica to alumina mole ratios of about 50:1 to about 100:1.

In a further embodiment, the zeolite component of the mordenite type, having a silica to alumina ratio of at least 40:1, is synthesized by first preparing a reaction mixture having the following, mole ratio composition:

| | |
|---|---|
| $SiO_2/Al_2O_3$ | 12–30 |
| $Na_2O/Al_2O_3$ | 1.5–2.5 |
| $H_2O/Na_2O$ | 60–200 | wherein the $SiO_2$ is employed as a cogel with the $Al_2O_3$. This reaction mixture is then maintained at a temperature of about 25° C. to about 250° C. for a time sufficient to convert substantially all of the $SiO_2$ and $Al_2O_3$ to a mordenite characterized by a $SiO_2/Al_2O_3$ mole ratio substantially as employed in the reaction mixture. The resultant mordenite is treated with an aqueous solution of an acid at a temperature of about 0° C. to about 200° C. and preferably near the normal boiling point of the acid such as about 100° C., for a time sufficient to extract at least a portion of the $Al_2O_3$ from the mordenite and to provide a mordenite composition having a $SiO_2/Al_2O_3$ mole ratio of at least 40. Preferably, the $SiO_2$ component of the $SiO_2/Al_2O_3$ cogel is derived from an acidic silica solution.

In another embodiment, this catalytic composition is utilized for the conversion of a hydrocarbon by contacting the catalytic composite with a hydrocarbon at hydrocarbon conversion conditions. Preferred hydrocarbon conversion processes include transalkylation processes such as the transalkylation of benzene and polyethylbenzenes to produce ethylbenzene.

I have found that the catalytic activity of mordenite prepared with a high silica to alumina mole ratio of about 12:1 to about 30:1 may be retained at a high level, while the stability of the resulting catalytic composite is remarkably improved, by combining this mordenite with a metal selected from copper, silver, gold and zirconium.

Other embodiments referring to specific catalytic compositions, method of their preparation and their use in specific hydrocarbon conversion reactions will be found in the following, more detailed description of the present invention.

DESCRIPTION OF PREFERRED EMBODIMENTS

As indicated, the catalytic composition of the present invention comprises a zeolite component of the mordenite type having a silica to alumina mole ratio of at least 40:1 which is prepared by acid extracting alumina from initial mordenite composition having a silica to alumina mole ratio of about 12:1 to about 30:1 and a metal component. The $SiO_2/Al_2O_3$ mole ratio of 40:1 in the zeolite component is obtained from a mordenite composition which is initially prepared with a $SiO_2/Al_2O_3$ mole ratio of about 12:1–30:1. This is contrasted to the art which acid extracts alumina from the present, commercially available mordenites which have a $SiO_2/Al_2O_3$ mole ratio of less than 12:1 and typically about 10:1.

Mordenite with an initial silica to alumina ratio of about 12:1 to about 30:1, to be increased later by acid extraction to at least 40:1, may be formed by any suitable means. A preferred method, however, for synthesizing this particular type of mordenite comprises first preparing a reaction mixture comprising silica, alumina and aqueous sodium hydroxide having a composition defined in terms of the following mole ratios:

| | |
|---|---|
| $SiO_2/Al_2O_3$ | 12–30 |
| $Na_2O/Al_2O_3$ | 1.5–2.5 |
| $H_2O/Na_2O$ | 60–200 | the silica component being employed as a cogel with the alumina component, and maintaining this reaction mixture at a temperature of about 25° to about 300° C. Thus, the mordenite component of the catalyst of this invention is preferably prepared from an initial mordenite formed by admixing a silica-alumina cogel with an aqueous sodium hydroxide solution to form a reaction mixture of the above composition and mole ratios. Preferably, the reaction mixture comprises silica and alumina in a mole ratio of from about 12:1 to about 25:1. The reaction mixture is preferably heated to a temperature of about 150° to about 250° C., until the sodium form of mordenite precipitates therefrom. By this method, substantially all of the silica and alumina in the reaction mixture is converted to the mordenite in a relatively brief period.

In accordance with the preferred embodiment of this invention, the silica component of the foregoing reaction mixture is employed as a cogel with the alumina component. This results in substantially complete conversion of silica to mordenite at a considerable increase in the rate of reaction, the reaction time being reduced sometimes to as much as one-half of that time required to prepare mordenite in current processes. A convenient source of the silica-alumina cogel reactant is conventional amorphous silica-alumina cracking catalyst containing less than about 14% by weight alumina. Preferred are cracking catalysts containing less than 10% aluminum and in particular those containing about 8% by weight alumina. These amorphous catalysts are typically manufactured through a series of process steps involving the initial formation of an acidic silica sol by the acidification of an aqueous sodium silicate solution (water glass). It has also been observed that a silica-alumina cogel reactant wherein the silica has been derived from an acidic silica sol, results in a further improved rate of reaction in the formation of mordenite. As a result, such silica-alumina cogels are preferred. Subsequent steps in the manufacture of this cracking catalyst include gelation of the silica sol after which the resulting slurry is adjusted to a pH of about 3.5 and then impregnated with an aluminum sulfate solution, the aluminum sulfate being thereafter hydrolyzed and precipitated. The silica-alumina product is then commonly slurried with water and spray dried to yield fine, silica-alumina microspheres, particularly suitable as a reactant in the preparation of the afore-described mordenite.

Another suitable silica-alumina cogel reactant comprising silica is derived from an acidic silica sol such as is prepared by the well-known oil drop method. In this method, an acidic silica sol, suitably prepared by conventional methods involving the acidification of water glass is commingled with an alumina sol, suitably prepared by digesting aluminum pellets in aqueous hydrochloric acid solution, with the resulting sol blend dispersed as droplets in a hot oil bath whereby gelation occurs accompanied by the formation of spheroidal cogel particles. In this type of operation, the silica is set thermally and the alumina is set chemically by utilizing ammonia as a neutralizing agent. Usually the ammonia is furnished by an ammonia precursor, such as urea and/or hexamethylenetetramine, which is included in the alumina sol. Alternatively, the acidic silica sol is commingled with an aluminum sulfate solution which has been partially hydrolyzed with aqueous ammonia solution, and the blend dispersed in the hot oil bath as hereinbefore described. In any case, the resulting silica-alumina cogel particles are usually aged in the hot oil bath and thereafter water-washed, dried and calcined.

While the silica-alumina cogel reactant may be derived from a basic silica sol, an improvement in the reaction rate is not as apparent. Such silica-alumina cogels are typically prepared by admixing an aqueous sodium silicate solution or sol with an acidic aluminum sulfate solution to form a sol blend characterized by a pH in excess of about 7. The blend is then immediately dispersed, substantially as droplets, in a hot oil bath, aged therein at an elevated temperature, water-washed, dried and calcined.

In any event, the mordenite initially prepared with a $SiO/Al_2O_3$ ratio in the range of 12:1–30:1 has at least a portion of the alumina removed by acid extraction methods well known to the art. This comprises treating the mordenite with relatively strong acids at temperatures from 0° C. to about 200° C. Preferred are mineral acids such as hydrochloric acid, nitric acid or sulfuric acid of at least 1 N concentration. Particularly preferred is hydrochloric acid in concentration ranges of about 1 N–15 N and temperature ranges of about 75° C.–125° C. As is well known to those trained in the art, by varying temperature, contact times and acid concentration, the exact degree of alumina removal can be controlled. Preferred are final mordenite composites containing a $SiO_2/Al_2O_3$ ratio of about 50:1 to 100:1. In addition to extracting the alumina from the mordenite, the acid treating will also simultaneously ion exchange hydrogen ions for the cations present therein.

Other acids which are also suitable include hydrobromic, acetic, phosphoric, chloroacetic, citric, tartaric and the like but not necessarily with equivalent results. In any event, whatever acids or conditions are utilized, they are to be so chosen and manipulated to avoid decomposition of the crystalline structure of the mordenite.

The resultant alumina deficient mordenite component of the catalyst may be used as prepared or may be suspended in an inorganic oxide support or matrix such as alumina, silica, thoria, magnesia, boria, silica-alumina and the like. Similarly, the hydrogen cations present in the resultant acid extracted mordenite may be exchanged for metallic cations capable of possibly increasing the catalytic activity and/or stability of the mordenite.

The metal component of the catalytic composite of the present invention comprises copper, silver, gold, or zirconium, or a combination of two or more of the foregoing metals. It is preferable that the metal component be present in the composite at about 0.01 wt. percent to about 10 wt. percent of the mordenite component. Good results are achieved by utilizing the metal component at about 0.1 wt. percent to about 5 wt. percent of the mordenite component. Of the metals noted above as suitable for use as the metal component in the composite, zirconium and silver are preferred, particularly zirconium. It has been found that these metals, when present in the composite, provide a surprising quality of stability, i.e., the composite retains a high catalytic activity under relatively mild hydrocarbon conversion conditions for a prolonged period of time, thus constituting an economical and technical improvement over previously disclosed hydrocarbon conversion catalysts. The metal compoent of the composite can be combined with the mordenite component in any suitable way. For example, the mordenite component may be impregnated with an aqueous solution of a salt of the metal component and dried.

The catalyst of the present invention is suitable for various hydrocarbon conversion reactions including cracking, hydrocracking, reforming, dealkylation, isomerization of aromatics suc has the xylenes, disproportionation, alkylation, transalkylation and the like. These hydrocarbon conversion reactions are effected by contacting the hydrocarbon with the catalyst at appropriate hydrocarbon conversion conditions. This contacting may be affected batchwise or continuously in an upflow, downflow or radial fashion. The catalyst thus may be utilized in a fixed-bed, moving-bed or fluidized-bed system.

The catalyst of the present invention is a particularly effective catalyst for catalyzing hydrocarbon transalkylation and alkylation reactions. Thus, this catalyst may be utilized to effect the transalkylation of an alkylaromatic hydrocarbon at transalkylation conditions including a temperature of about 0° C. to about 500° C. and a pressure of about atmospheric to about 100 atmospheres. Suitable reactions include the transalkylation of an alkylaromatic hydrocarbon and an alkylatable aroamtic hydrocarbon. Applicable reactions thus include the transalkylation of toluene to produce benzene and xylenes, the transalkylation of toluene with $C_9$ methyl aromatics to produce xylenes, or the transalkylation of benzene with polyethylbenzene to produce ethylbenzene. Thus, the alkylaromatic hydrocarbons which may be utilized include toluene, the xylenes, ethylbenzene, the ethyltoluenes, the diethylbenzenes, the triethylbenzenes, the trimethylbenzenes, the normal propylbenzenes, the isopropylbenzenes, the butylbenzenes and higher molecular weight alkylaromatic hydrocarbons and mixtures thereof.

Transalkylation reactions are preferably effected at a temperature of about 200° C. to about 500° C. in a continuous manner utilizing the described catalyst as a fixed bed. Further when utilizing toluene as a reactant to form benzene xylenes a downflow, vapor phase operation is preferred whereas in the transalkylation of benzene with polyethylbenzene to form ethylbenzene, it is preferred to utilize an upflow liquid phase operation. In any event, contact times, expressed in terms of liquid hourly space velocity, of about 0.1 to about 20 hr.$^{-1}$ or more may be utilized and the reactants may be commingled with an inert gas such as nitrogen, hydrogen argon, methane, ethane, etc.

The catalyst of the present invention may also be utilized to effect the alkylation of an alkylatable hydrocarbon and an olefin-acting compound at alkylation conditions including a temperature of about 150° C. to about 300° C., a pressure of about atmospheric to about 60 atmospheres, and a liquid hourly space velocity (LHSV) of about 1 to about 5 hr.$^{-1}$ or more. Suitable alkylatable hydrocarbons include the alkylatable aromatic hydrocarbons, particularly the monocyclic aromatic hydrocarbon such as benzene. In addition to benzene, other suitable alkylatable monocyclic aromatic hydrocarbons include toluene, xylenes, ethylbenzene, ethyltoluene, the trimethylbenzene, normal propylbenzene, isopropylbenzene (cumene), normal butylbenzene, etc. Higher molecular weight alkylaromatic hydrocarbons are also suitable and include aromatic hydrocarbons such as are produced by the alkylation of aromatic hydrocarbons and olefin polymers. Such hydrocarbons include hexylbenzenes, nonlybenzenes, dodecylbenzenes, pentadecylbenzenes, hexyltoluenes, dodecyltoluenes, etc. Other suitable alkylatable hydrocarbons include those aromatics with two or more phenyl groups present, such as diphenyl, diphenylmethane, triphenyl, triphenylmethane, fluorene, stilbene, etc. Also suitable are the condensed aromatic hydrocarbons including naphthalene, alkylnaphthalenes, anthracenes, phenanthrenes, etc. However, whenever using these higher molecular weight aromatic hydrocarbons, it is imperative that the alkylation temperature be maintained at a temperature high enough to prevent these compounds from solidifying in the alkylation reaction zone. Also applicable as alkylatable hydrocarbons include the isoparaffinic hydrocarbons such as isobutane, isopentane, isohexane and the like.

The olefin-acting compounds suitable for alkylating foregoing alkylatable hydrocarbons may be selected from the diverse materials including monoolefins, diolefins, polyolefins, acetylenic hydrocarbons, alcohols, ethers, alkylhalides, alkylsulfates, alkylphosphates, and the various carboxylic esters. The preferred olefin-acting compounds include the monoolefins containing one double bond per molecule as well as polyolefins containing more than one double bond molecule. Mono-olefins which may be utilized are a normally gaseous, or normally liquid olefins and include ethylene, propylene, 1-butene, 2-butene, isobutylene as well as the high molecular weight normally liquid olefins such as the various pentenes, hexenes, heptenes, octenes, etc., and the various mixtures thereof. Also suitable are the still higher molecular weight liquid olefins containing from about 9 to 18 carbon atoms per molecule, including propylene trimer, propylene tetramer, propylene pentamer, as well as those olefins produced by the dehydrogenation of $C_8$–$C_{18}$ straight chain paraffins. Cyclo-olefins such as cyclopentene, methylcyclopentene, methylcyclohexene, cyclohexene, etc. are also included within the broad scope of the present invention. Also included as olefin acting compounds are certain compounds capable of producing olefin hydrocarbon or intermediates thereof under the conditions typically utilized in the alkylation reaction. These include the alkyl halides containing at least two carbon atoms per molecule such as ethylfluoride, normal propylfluoride, isopropylfluoride, normal butylfluoride, isobutylfluoride, secondary butylfluoride, etc. as well as the corresponding chlorides, bromides and iodides of the foregoing illustrated compounds. Also suitable are alkyl sulfates including ethylsulfate, propylsulfate, etc. and the alkyl phosphates including ethylphosphates, ethylpropylsulfate, etc. Ethers such as diethylether, ethylpropylether, dipropylether, etc., are also included within the generally broad scope of the term olefin-acting compound and may be successfully utilized to alkylate the foregoing alkylatable hydrocarbons according to the process of the present invention. Particularly preferred, however, is the alkylation of isobutane, or isopentane with ethylene or propylene.

The present invention is further illustrated by the following illustrative embodiments which are presented to illustrate the preparation of the catalytic composition of the present invention and its utilization in hydrocarbon conversion reactions. These examples, however, are not provided to limit the scope of the present invention which is to be limited only by the appended claims.

ILLUSTRATIVE EMBODIMENTS

Illustration I

Mordenite, having a $SiO_2/Al_2O_3$ mole ratio of about 17 was synthesized from a silica-alumina cogel reactant wherein the silica was derived from an acidic silica sol. This silica-alumina cogel reactant was prepared by acidifying 1085 cc. of 16% sodium silicate solution (water glass) with 335 cc. of 19% hydrochloric acid to yield a silica sol with a pH of about 1.8. The silica sol was then blended with 54 cc. of an alumina sol (containing the equivalent of 17.4 grams of alumina) and 87 cc. of 28% aqueous hexamethylenetetramine solution. The resulting sol blend was dispersed as droplets in an oil bath, aged therein at about 70° C. for about 20 hours, and thereafter water-washed, dried and calcined at about 600° C. The resultant silica-alumina cogel reactant contained 8.1 wt. percent alumina and 91.9 wt. percent silica. About 470 grams of these 1/16" silica-alumina cokel spheres were admixed with 59.0 grams of sodium hydroxide in aqueous solution (1500 cc.) and sealed in an autoclave. The autoclave was rotated and heated to a temperature of 200° C. over a 2 hour period and further rotated and heated at 200° C. for 12 hours. The reaction mixture was thereafter cooled to room temperature and filtered to recover the solids product. The product was water-washed until the washings indicated a pH of 10 and thereafter dried at 110° C. X-ray analysis indicated the product to be 100% mordenite with a $SiO_2/Al_2O_3$ mole ratio of 17.2. Similar results are obtained in preparing this type mordenite when utilizing a silica derived from a basic silica source but the reaction times are somewhat longer.

Illustration II

The mordenite in Illustration I was acid-extracted with 2800 cc. of 12 N hydrochloric acid at a temperature of 100° C. for a period of 12 hours. This mordenite was designated as mordenite A. In a similar fashion, commercially available Na mordenite (Norton Co., Worcester, Mass.) having a $SiO_2/Al_2O_3$ mole ratio of about 10 was acid extracted and was designated as mordenite B. Each mordenite, A and B, had sufficient alumina removed so that each has a $SiO_2/Al_2O_3$ ratio of about 50. Both mordenites were washed with water to remove excess acid.

A sample of mordenite A was selected and an amount of $AgNO_3$ sufficient to contain 1 wt. percent Ag, based on the weight of the mordenite sample, was measured and dissolved in water. An amount of $NH_4NO_3$ sufficient to provide an ionic strength of 1 in the $AgNO_3$ solution was added thereto. The sample of mordenite A was placed in a steam heated rotary evaporator, the Ag-containing solution was poured over it, and the sample was evaporated to dryness. The sample was then removed from the rotary evaporator, placed in a muffle furnace, and calcined at 700° C. for one hour. The calcined sample was reduced in a hydrogen atmosphere at 400° C. for 2.5 hours. The exact same procedure was followed with a sample of mordenite B. The composite containing mordenite A was designated catalyst A and the composite containing mordenite B was designated catalyst B.

Illustration III

Catalysts A and B were compared in the fixed bed upflow liquid phase transalkylation of ethylbenzene to produce benzene and diethylbenzene. This reaction was chosen as a model for the commercially important transalkylation of polyethylbenzenes with benzene to form ethylbenzene. The operations were carried out at 500 p.s.i.g. and 2 LHSV with a small amount (0.25 cubic foot per hour) of $H_2$ added. At these conditions, catalyst A required 250° C. to attain a 45% conversion while catalyst B required 275° C. for the same conversion. A further comparison was obtained by running both catalysts at 250° C. At this temperature, catalyst A gave a 45% conversion while catalyst B gave only a 20% conversion. Not only was the activity of catalyst A found to be much greater than that of catalyst B, but it was observed that catalyst A was also more stable than catalyst B, retaining a high degree of activity after the activity of catalyst B had dropped to a very low level.

Illustration IV

A sample of mordenite A, as described in Illustration II, was selected and calcined at 700° C. for one hour. A solution of zirconium acetylacetonate in an ether-acetone mixture was prepared. The calcined sample of mordenite A was contacted with the zirconium acetylacetonate solution and the volatile components of the solution were evaporated from the mordenite in a rotary evaporator at room temperature in a stream of air. After evaporation was complete, the zirconium-mordenite composite was reduced in a stream of hydrogen at 500° C. for two hours. The resultant composite was designated catalyst C.

Illustration V

Catalyst C prepared as described in Illustration IV was placed in a fixed bed in the system employed in Illustration III. Ethylbenzene was passed in liquid phase upflow over the catalyst bed at 2 LHSV. The transalkylation zone was maintained at a temperature of 270° C., and hydrogen gas was added at the rate of 0.25 cubic foot per hour. When the hydrocarbon effluent was analyzed, it was found that the catalyst produced a conversion of 43.5% with excellent catalyst stability observed.

Illustration VI

A sample of mordenite A, and a sample of catalyst A, both prepared as described in Illustration II, and a sample of catalyst C, prepared as described in Illustration IV, were compared in the ethylbenzene transalkylation system of Illustration III. The tests were conducted under identical conditions of 250° C. and 500 p.s.i.g., with the feed passed in liquid phase upflow through the catalyst bed, with 0.25 cubic foot per hour of hydrogen added. Initial conversions to benzene, diethylbenzene and polyethylbenzenes were observed to be: mordenite A, 30%; catalyst A, 47.5%; and catalyst C, 21.5%. It was observed that the activity of mordenite A decreased rapidly. After 100 hours of continuous use, the following conversions were observed: mordenite A, 6%; catalyst A, 45%; and catalyst C, 20%.

Illustration VII

A sample of mordenite A, as described in Illustration II was selected and an amount of $Cu(NO_3)_2$ sufficient to contain 1 wt. percent Cu, based on the weight of the mordenite sample, was measured and dissolved in water. An amount of $NH_4NO_3$ sufficient to provide an ionic strength of 1 in the $Cu(NO_3)_2$ solution was added thereto. The mordenite sample was placed in a steam heated rotary evaporator, the $Cu(NO_3)_2$ solution was poured over it, and the sample was evaporated to dryness. The sample was then calcined at 700° C. for one hour. The calcined sample was reduced in a hydrogen atmosphere for 2.5 hours at a temperature of 400° C. The resulting composite was designated catalyst D.

Illustration VIII

Catalyst D, as prepared in Illustration VII, was employed in the fixed bed, liquid phase, upflow transalkylation of ethylbenzene. Transalkylation conditions were maintained to provide a temperature of 250° C., a pressure of 500 p.s.i.g. and feed rate of 2 LHSV. 0.25 cubic foot per hour of hydrogen was added. An initial conversion of 37% of the charged ethylbenzene was observed, while after 100 hours of continuous operation, the conversion was observed to be stable at 20%.

I claim as my invention:

1. A process for the transalkylation of an alkylaromatic hydrocarbon which comprises contacting said hydrocarbon at transalkylation conditions with a catalyst composition comprising a zeolite component having a mordenite crystal structure and having a silica to alumina mole ratio of at least 40:1 prepared by acid extracting alumina from an initial mordenite composition prepared with a silica to alumina mole ratio of about 12:1 to about 30:1 and a metal component selected from the group consisting of copper, silver, gold and zirconium.

2. The process of claim 1 further characterized in that said transalkylation conditions include a temperature of about 500° F. to about 850° F. and a pressure of about 10 atmospheres to about 100 atmospheres.

3. The process of claim 1 further characterized in that said alkylaromatic hydrocarbon is toluene.

References Cited
UNITED STATES PATENTS

| | | | |
|---|---|---|---|
| 3,367,884 | 2/1968 | Reid | 252—455 Z |
| 3,436,174 | 4/1969 | Sand | 23—113 |
| 3,212,795 | 5/1969 | Kerr et al. | 208—120 |
| 3,476,821 | 11/1969 | Brandenburg et al. | 260—672 T |
| 3,480,539 | 11/1969 | Voorhies et al. | 208—111 |
| 3,551,510 | 12/1970 | Pollitzer et al. | 260—672 T |
| 3,562,345 | 2/1971 | Mitsche | 260—672 T |
| 3,578,723 | 5/1971 | Bowes et al. | 260—672 T |

CURTIS R. DAVIS, Primary Examiner

U.S. Cl. X.R.

260—668 A, 683.43, 683.64